United States Patent
Jess et al.

(10) Patent No.: US 7,641,587 B2
(45) Date of Patent: Jan. 5, 2010

(54) FUEL QUALITY INDICATION FOR ADAPTIVE TRANSMISSION CONTROL

(75) Inventors: Richard B. Jess, Haslett, MI (US); Jeffrey A. Sell, West Bloomfield, MI (US); John E. Marano, Milford, MI (US); Julian R. Verdejo, Farmington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 472 days.

(21) Appl. No.: 11/688,396

(22) Filed: Mar. 20, 2007

(65) Prior Publication Data

US 2008/0234103 A1    Sep. 25, 2008

(51) Int. Cl.
    *F16H 59/60*    (2006.01)
(52) U.S. Cl. ............................................ 477/97
(58) Field of Classification Search ........... 477/97; 701/58, 65
    See application file for complete search history.

(56) References Cited

U.S. PATENT DOCUMENTS

| 4,677,878 | A | * | 7/1987 | Yamamori et al. | 477/48 |
| 4,843,916 | A | * | 7/1989 | Bouta | 477/97 |
| 5,050,082 | A | * | 9/1991 | Kato | 701/99 |
| 5,088,350 | A | * | 2/1992 | Kurihara et al. | 477/120 |
| 5,167,169 | A | * | 12/1992 | Saito et al. | 477/62 |
| 5,261,297 | A | * | 11/1993 | Kashiwabara et al. | 477/115 |
| 7,247,124 | B2 | * | 7/2007 | Tamai | 477/115 |

* cited by examiner

*Primary Examiner*—Dirk Wright

(57) ABSTRACT

A control system and method for adaptively controlling transmission ratio shifting in an electronically controlled transmission. A refueling event is detected. After the detected refueling event, fuel consumption is monitored for a predetermined period during which a change in composition of fuel to the engine reaches or approaches a steady state. During the period, the rate of adapting transmission shift controls is modified to respond quicker to the change in shift characteristics induced by differences in torque produced by the engine. Implementing this method can improve transmission shift quality while the quality of fuel reaching an engine is in transition.

18 Claims, 3 Drawing Sheets

FUEL QUALITY INDICATION FOR ADAPTIVE TRANSMISSION CONTROL

FIELD OF THE INVENTION

The present invention relates generally to a powertrain control system, and more particularly to adaptive shift controls of an electronically controlled transmission to respond to changes in fuel quality.

BACKGROUND OF THE INVENTION

When a driver refuels a motor vehicle, the composition of fuel (also referred to as fuel quality) in the fuel tank may change significantly with the addition of new fuel. For example, ethanol and/or gasohol can be introduced into a fuel tank containing gasoline. Fuel quality can impact the torque generating capability of an internal combustion engine. Torque output of the engine may be impacted positively or negatively by as much as seven percent after a refueling event. Although currently manufactured powertrains may include adaptive transmission shift controls to improve shift quality, such controls tend to adapt belatedly to changes in fuel quality.

SUMMARY OF THE INVENTION

The present invention, in one embodiment, is directed to a method of adaptively controlling transmission ratio shifting in a vehicle equipped with an electronically controlled transmission. First, a refueling event is detected. After the detected refueling event, fuel consumption is monitored over a predetermined period during which a change in composition of fuel to the engine reaches or approaches a steady state condition. During this period, the rate of adapting the transmission shift controls is modified to respond quicker to the errors in ratio change characteristics that may be induced by differences in torque produced by the engine.

In another configuration, the invention is directed to a system for adaptively controlling the shifting of transmission ratios in an electronically controlled transmission. A control module controls the transmission to adapt the shifting to cause at least one actual shift parameter to converge with at least one predefined shift parameter. First, the control module detects a refueling event. After the detected refueling event, the control module monitors fuel consumption by the engine for a period predefined in terms of fuel consumption. During the period, the control module controls the transmission to increase a rate of adapting to deviations from the desired shifting characteristics.

In another implementation, the invention is directed to a system for controlling a powertrain in a vehicle having an engine and a transmission that adaptively shifts transmission ratios in accordance with learned shift parameters. A control module captures a baseline fuel level in a fuel tank of the vehicle. The control module recognizes a refueling event after the baseline fuel level is captured. The control module tracks fuel consumed after the recognized refueling event until a predetermined amount of fuel is consumed. During the tracking period, the control module triggers the transmission shift controls to learn shift parameters responsive at least in part to the fuel consumed. The learning is performed at a rate faster than a rate of learning performed before and after the tracking period.

In yet another implementation, the present invention is directed to a method of controlling a powertrain in a vehicle. The vehicle has an engine and a transmission that adaptively shifts transmission ratios in accordance with learned shift parameters. A baseline fuel level in a fuel tank of the vehicle is captured. After the capturing step, a refueling event is recognized. Fuel consumed is tracked after the recognizing event until a predetermined amount of fuel is consumed. During the tracking period, the transmission is triggered to learn shift parameters responsive at least in part to the fuel consumed. The learning is performed at a rate faster than a rate of learning performed before and after the tracking period.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

Figure 1:
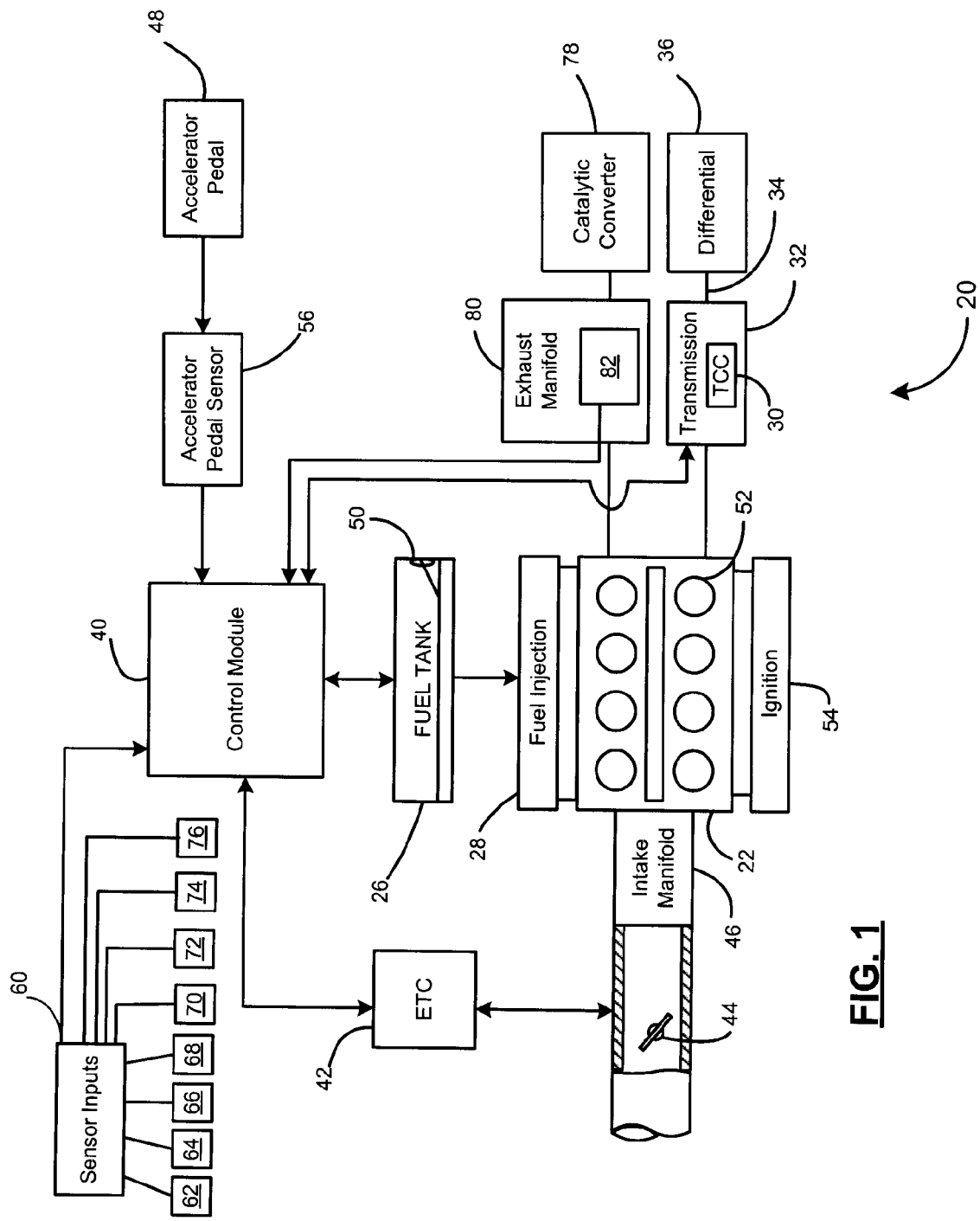
FIG. 1 is a functional block diagram of a vehicle providing adaptive transmission shift control in accordance with one embodiment of the present invention.

The following description of various embodiments of the present invention is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle containing adaptive transmission shift controls in accordance with one embodiment of the present invention is indicated generally by reference number 20. The vehicle 20 may be fueled with gasoline and/or ethanol in various percentages. Fuel is delivered to an engine 22 from a fuel tank 26 through a plurality of fuel injectors 28. An output of the engine 22 is coupled by a torque converter 30, a transmission 32, a driveshaft 34 and a differential 36 to driven wheels (not shown). The transmission 32 transmits power to the differential 36 in accordance with a plurality of transmission ratios. The transmission 32, which may be, for example, a continuously variable transmission (CVT) or a step-gear automatic transmission, is controlled by a control module 40. It should be understood that a control module, for example, a transmission control module (TCM), could be used alone or in combination with an engine control module (ECM) in other embodiments to control the transmission 32.

An electronic throttle controller (ETC) 42 adjusts a throttle plate 44 that is located adjacent to an inlet of an intake manifold 46 based upon a position of an accelerator pedal 48 and a throttle control algorithm that is executed by the control module 40. The throttle 44 adjusts output torque of the engine 22.

A fuel sensor 50 senses a level of fuel in the tank 26 and communicates the fuel level to the control module 40. Air is delivered to the engine 22 through the intake manifold 46. Vapor from the fuel tank 26 may be collected and delivered to the intake manifold 46 and burned in engine cylinders 52. The control module 40 controls operation of fuel injectors 28 and an ignition system 54. The control module 40 also is connected with an accelerator pedal sensor 56 that senses a position of the accelerator pedal 48 and sends a signal representative of the accelerator pedal position to the control module 40. Other sensor inputs collectively indicated by reference number 60 and used by the control module 40 include an engine speed signal 62, a vehicle speed signal 64, an intake manifold pressure signal 66, a manifold air temperature signal 76 and a throttle position signal 68. An engine torque signal 70 indicates engine load on the transmission 32. Signals 72 and 74 indicate transmission input and output pulley speeds.

A catalytic converter 78 receives exhaust from the engine 22 through an exhaust manifold 80. An oxygen sensor 82 senses exhaust in the manifold 80 and delivers signals to the control module 40 indicative of whether the exhaust gas is lean or rich. The signal output of the oxygen sensor 82 is used by the control module 40 as feedback in a closed-loop manner to regulate fuel delivery to the engine 22 via fuel injectors 28.

The control module 40 may use the exhaust sensor 82 feedback to drive an actual air-fuel ratio to a desired value, usually around a stoichiometric value. A plurality of pre-defined engine operating regions is referred to by the control module 40 in controlling fuel delivery to the engine 22. Operating regions may be defined, for example, based on speed and/or load of the engine 22. The control module 40 may perform control functions that vary dependent on which operating region of the vehicle is currently active.

Fuel, air and/or re-circulated exhaust to the engine 22 may be adjusted, i.e., trimmed, to correct for deviations from a desired air-fuel ratio. Trim values used to make such corrections may be stored in control module 40 memory locations corresponding to a plurality of predefined closed loop air-fuel ratio control cells (also referred to as sub-regions) associated with the operating regions of the engine 22. Cell values may be used to provide closed-loop fuel, air and/or re-circulated exhaust control. For example, long-term multipliers (LTMs) associated with the cells may be used to learn and provide long-term corrections to fuel commands to the engine 22 in response to evolving conditions. A short-term integrator (STI) also may be used to provide short-term fuel trim corrections as known in the art.

The transmission 32 may be controlled by the control module 40 to adaptively control transmission ratio shifting in order to improve shift quality. After a shift is made, for example, requested by an operator of the vehicle 20, parameters such as shift delay and shift time may be periodically compared to parameters predetermined to represent optimal shift quality. The control module 40 then may cause hydraulic pressure magnitude and profile adjustments to be made to cause the actual shift parameters to converge with the predetermined optimal parameters the next time a shift is made under similar operating conditions, e.g., engine RPM, engine load, and road load conditions.

For example, the control module 40 may compare an actual shift time to a desired shift time to obtain a shift error. The control module 40 uses the shift error to adjust hydraulic pressure to the transmission 32 to reduce or eliminate shift error in a subsequent shift. Shift errors may be stored by the control module 40 in a plurality of cells similar to the cells discussed above with reference to engine fuel trim. The transmission cells are pre-designated, for example, based on a plurality of torque ranges of the engine 22.

In one implementation of the present invention, a refueling event is detected. After the detected refueling event, fuel consumption is monitored for a predetermined period during which a possible change in fuel composition to the engine 22 reaches or approaches a steady state. During the predetermined period, the rate of adapting transmission shift controls is modified to respond quicker to errors in ratio change characteristics that may be induced by differences in torque produced by the engine.

Figure 2:
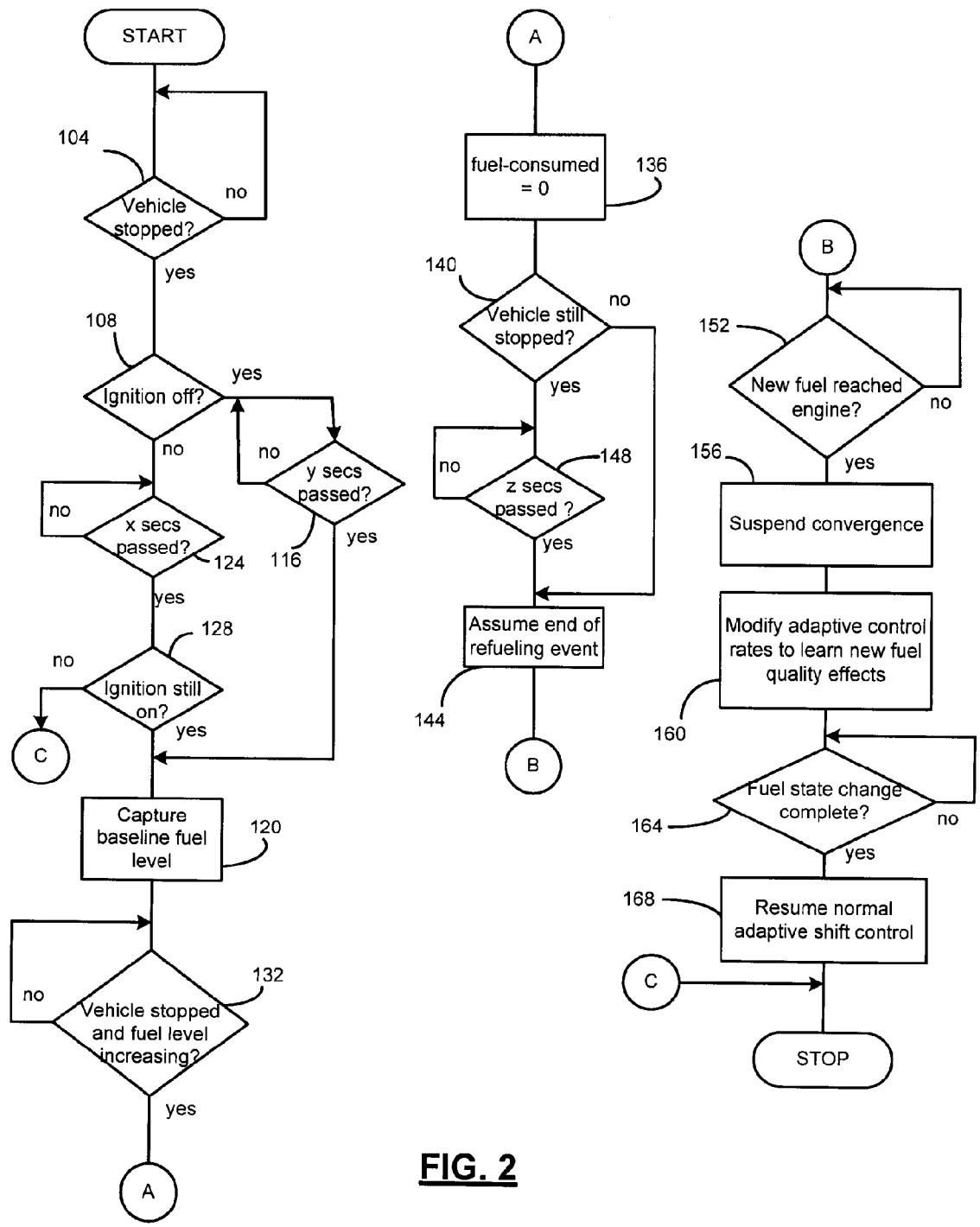
FIG. 2 is a flow diagram of a method of providing adaptive transmission shift control in accordance with one embodiment of the present invention.

One implementation of a method of adaptively controlling the shifting of transmission ratios in the transmission 32 is indicated generally in FIG. 2 by reference number 100. A baseline level of fuel in the tank 26 is obtained in order to evaluate an increase in fuel level due to a refueling. Generally, before a baseline level is obtained, at least enough time is allowed to pass during which a fuel level in the tank 26 can settle after the vehicle 20 comes to a stop. Such time, however, also is limited to avoid a possibility that the vehicle operator could add a significant amount of fuel to the tank 26.

Accordingly, in step 104 it is determined whether the vehicle 20 has stopped. If the vehicle is stopped, it is determined in step 108 whether the vehicle ignition system 54 is switched off. If yes, then in step 116 it is determined whether a first predetermined time period has expired. When the time has expired, in step 120 a baseline fuel level in the fuel tank 26 is captured. The first time period preferably expires just before the control module 40 shuts down completely. In one implementation, shutdown of the control module 40 is delayed long enough, e.g., several seconds, to allow fuel to settle so that a baseline capture may be made.

If the operator refuels the vehicle 20 without switching off the ignition system 54, time is allowed pass before the refuel event is acknowledged. During such time, a baseline fuel level can be obtained before evaluating the refuel event. Thus, accuracy of the present implementation can be preserved, for example, if the vehicle has come to a stop on a non-level surface. Accordingly, if in step 108 it was determined that the ignition system 54 is on, then in step 124 it is determined whether a second predetermined time period has expired. When the second period has expired, then in step 128 it is determined whether the ignition system 54 is still switched on. If yes, then in step 120 a baseline fuel level in the fuel tank 26 is captured. (It should be noted that the terms "first", "second" and so on, when used in connection with time or other periods, do not necessarily refer to any chronological order. It also should be noted, for example that a "first" period may or may not be equal to a "second" period.)

In step 132 a refuel event may be detected. It is assumed that the vehicle 20 is stopped during a refuel event. Accordingly, in step 132 it is determined whether the vehicle 20 is stopped and whether a fuel level in the tank 26 is increasing. If yes, then in step 136 a variable representing an amount of fuel consumed ("fuel-consumed variable") is set to zero. The fuel-consumed variable preferably is stored in non-volatile memory so that fuel consumed may be tracked across ignition cycles. In step 140 it is determined whether the vehicle 20 is still stopped. If not, then in step 144 it is assumed that the refuel event is completed. If in step 140 it is determined that the vehicle 20 is still stopped, it is determined in step 148 whether a third predetermined time period has passed since the refuel detection, such that it can be assumed that the fuel level in the tank 26 is no longer increasing. If yes, then in step 144 it is assumed that the refuel event is completed.

The fuel-consumed variable is updated as fuel is consumed by the engine 22. In step 152 it is determined whether fuel added in the refueling is being "seen" by the engine 22. Such determination is made based on the fuel-consumed variable as further described below. If the new fuel is determined to be reaching the engine 22, then in step 156 the control module 40 enters into a state in which it suspends performing convergence of adaptive transmission shift control as previously learned. Adaptive control rates are modified in step 160 so that the control module learns the effects (if any) of a possible fuel quality change due to the refueling. In step 164 the fuel-consumed variable is used to determine whether a transition from old fuel to a mixture of old and new fuel is complete. If yes, then in step 168 the control module returns to a normal adaptive transmission shift controls.

Figure 3:
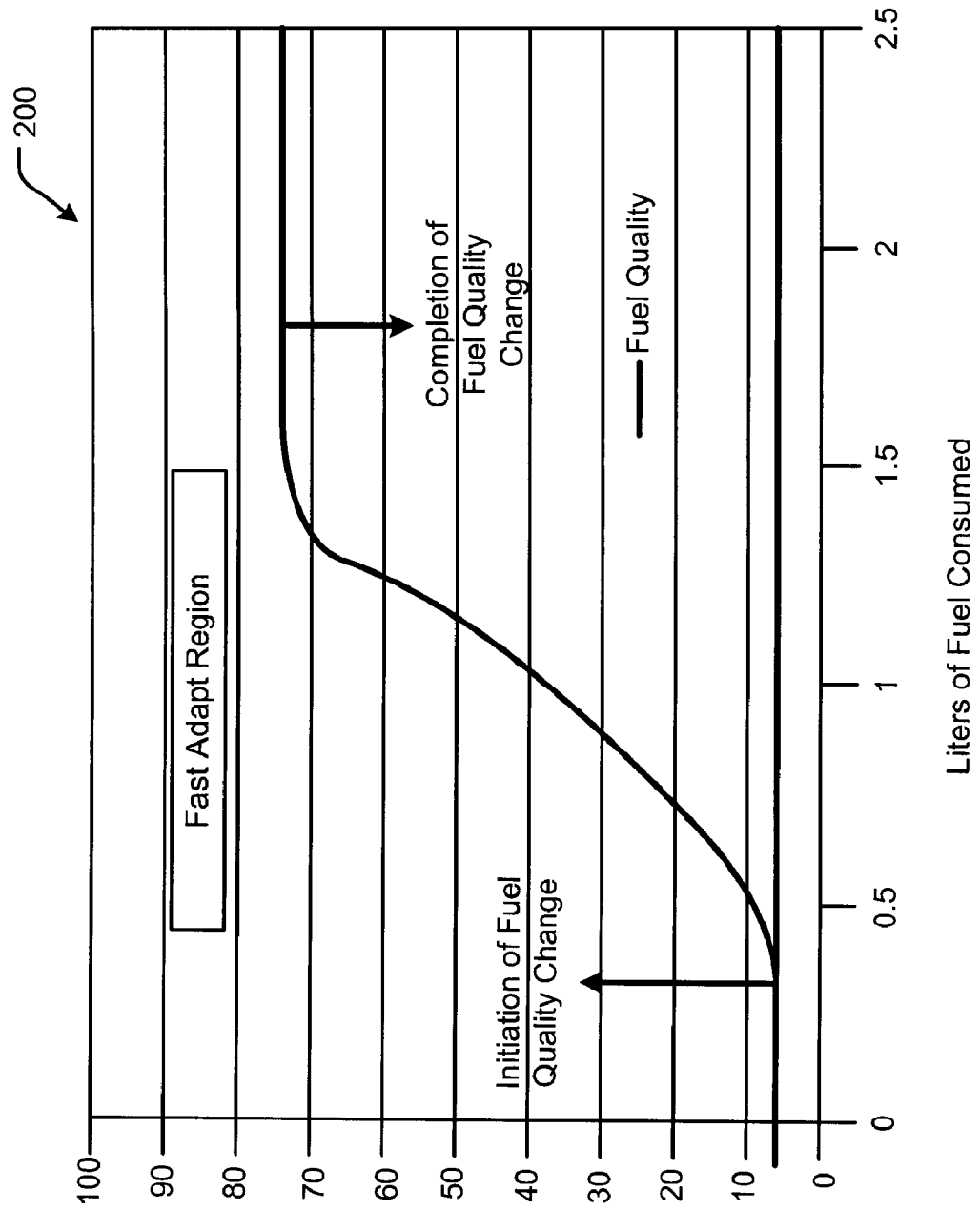
FIG. 3 is a graph indicating shift adaptation relative to fuel quality transition and amounts of fuel consumed in accordance with one implementation of the present invention.

A graph indicating shift adaptation relative to fuel quality transition and amounts of fuel consumed in accordance with one implementation is indicated generally in FIG. 3 by reference number 200. Generally, a mixing and transport delay that typically occurs before a fuel change reaches the engine 22 can be characterized consistently when expressed in terms of fuel consumed since detection of a refueling event. Accordingly, signaling by the control module 40 to the transmission 32 of onset and completion of a transition between fuel already in the tank 26 ("old fuel") and a mixture of old and added fuels can be calibrated in the following manner. Closed-loop fuel control LTMs (long term multipliers) may be frozen, that is, prevented from performing long-time learning of fuel trim as described previously. After adding, for example, ten percent ethanol to gasoline fuel in the tank 26, the closed-loop fuel control STI (short term integrator) may be monitored. The added fuel is preferably selected to have a measurable but minor effect on engine performance. The STI may be used to measure a transition between old and combined fuels to provide one or more calibration values. In one implementation in which fuel transitions are modeled based on mixing of fuel and transport delays in the vehicle fuel system, a plurality of shift adaptation stages may be calibrated and performed to provide a plurality of stages of adaptive transmission shift control.

The foregoing adaptive transmission shift control system can improve shift quality while the quality of fuel reaching an engine is in transition. Implementations of the present invention can account for fuel quality changes that typically occur quickly compared to time periods needed by current adaptive transmission shift control systems to improve shift quality.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of adaptively controlling transmission ratio shifting in a vehicle equipped with an electronically controlled transmission, said method comprising:
   detecting a refueling event;
   after the detected refueling event, monitoring fuel consumption over a predetermined period during which a change in composition of fuel to the engine reaches or approaches a steady state condition; and
   during this period, the rate of adapting transmission shift controls is modified to respond to the change in shift characteristics induced by differences in torque produced by the engine.

2. The method of claim 1 further comprising calibrating the period based on fuel consumed.

3. The method of claim 2 wherein said calibrating comprises the steps of:
   adding a fuel having a first composition to a fuel having a second composition in a fuel tank of the vehicle, wherein the first composition is different from the second composition; and
   monitoring a closed-loop fuel control short term integrator to provide at least one calibration value.

4. The method of claim 3, performed while a closed-loop fuel control long-term multiplier remains constant.

5. The method of claim 1 wherein detecting a refueling event comprises:
   determining whether the vehicle is stopped and whether an ignition system of the vehicle is switched off; and
   capturing a baseline fuel level in a fuel tank of the vehicle after a predetermined time period based on said determining step.

6. The method of claim 1 further comprising assuming the refueling event is ended based on whether the vehicle is stopped for a predetermined time after the refueling event is detected.

7. The method of claim 1 wherein increasing a rate of adapting the transmission shift controls comprises increasing a rate of convergence between actual and desired shift parameters.

8. A system for adaptively controlling the shifting of transmission ratios in a electronically controlled transmission, said system comprising a control module that controls the transmission to adapt the ratio shifting to cause at least one actual shift parameter to converge with at least one predefined shift parameter;
   wherein said control module:
       detects a refueling event;
       after the refueling event, monitors fuel consumption by the engine for a period predefined in terms of fuel consumption; and
       during the period, controls the transmission to increase a rate of adapting during transmission ratio shifting.

9. The system of claim 8 wherein said control module controls the transmission during said period to suspend normal shift adaptation in accordance with at least one previously learned shift parameter.

10. The system of claim 8 wherein said control module controls the transmission after said period to resume normal shift adaptation in accordance with at least one shift parameter learned during the period.

11. The system of claim 8 wherein, to detect a refueling event, said control module:
   determines whether the vehicle is stopped and whether an ignition system of the vehicle is switched on; and
   captures a baseline fuel level in a fuel tank of the vehicle after a predetermined time period based on said determining.

12. The system of claim 8 wherein said control module controls the transmission to adapt the ratio shifting to respond to a change in fuel quality to an engine of the vehicle.

13. A system for controlling a powertrain in a vehicle having an engine and a transmission that adaptively shifts transmission ratios in accordance with learned shift parameters, said system comprising a control module that:

captures a baseline fuel level in a fuel tank of the vehicle;

recognizes a refueling event after the baseline fuel level is captured;

tracks fuel consumed after the recognized refueling event until a predetermined amount of fuel is consumed; and during said tracking period, causes the adaptive transmission shift controls to learn shift parameters responsive at least in part to the fuel consumed, said learning performed at a rate faster than a rate of learning performed before and after said tracking period.

14. The system of claim 13 wherein during said tracking period, said control module suspends the normal learning performed before said tracking period.

15. The system of claim 13 wherein after said tracking period, said control module resumes the normal learning performed before said tracking period.

16. The system of claim 13 wherein during said tracking period, said control module controls the transmission to increase a rate of adapting to deviations from the desired shifting characteristics.

17. A method of controlling a powertrain in a vehicle having an engine and a transmission that adaptively shifts transmission ratios in accordance with learned shift parameters, said method comprising:

capturing a baseline fuel level in a fuel tank of the vehicle;

recognizing a refueling event after said capturing step;

tracking fuel consumed after said recognizing step until a predetermined amount of fuel is consumed; and during said tracking, causing the adaptive transmission shift controls to learn shift parameters responsive at least in part to the fuel consumed, said learning performed at a rate faster than a rate of learning performed before and after said tracking period.

18. The method of claim 17, further comprising after said tracking period, adaptive transmission shift controls are returned to the learning performed before said tracking.

* * * * *